Jan. 9, 1934.   M. B. BENSON   1,942,794
SPEED REDUCER
Filed Feb. 5, 1931   3 Sheets-Sheet 1

INVENTOR
Melvin B. Benson,
BY
Bartlett Eyre Scott Keel
ATTORNEYS

Jan. 9, 1934.    M. B. BENSON    1,942,794
SPEED REDUCER
Filed Feb. 5, 1931    3 Sheets-Sheet 2

INVENTOR
Melvin B. Benson
BY
Bartlett Eyre Scott Keel
ATTORNEYS

Jan. 9, 1934.  M. B. BENSON  1,942,794
SPEED REDUCER
Filed Feb. 5, 1931  3 Sheets-Sheet 3

INVENTOR
*Melvin B. Benson*
BY
*Bartlett Eyre Scott & Keil*
ATTORNEYS

Patented Jan. 9, 1934

1,942,794

UNITED STATES PATENT OFFICE 1,942,794

SPEED REDUCER

Melvin B. Benson, New York, N. Y., assignor, by mesne assignments, to Melvin B. Benson Corporation, New York, N. Y., a corporation of New York Application February 5, 1931. Serial No. 513,571

19 Claims. (Cl. 74—35)

This invention relates to a power transmission and gear reduction system.

The object of the invention is a gear reduction system and mechanism whereby practically any desired gear reduction ratio may be obtained without multiplication of the gear elements and their sizes and particularly such a system or mechanism which is characterized by its simplicity in construction and operation, by its compactness in over-all dimensions and by its reliability and smoothness in operation. More particularly my reduction gear drive includes a relatively stationary gyrating gear traversing an internal gear member and a further object of the invention is a gear reduction unit of this character embodying means whereby the unit is operable under the varying conditions of speed and power applications without the vibration in operation and pulsations in transmission characteristic of prior gyral gears. To this end the gyrating gear is restrained in rotation in a manner to assure a uniform pitch line velocity of the internal gear element and a non-pulsating transmission throughout each gyrating revolution and by a means characterized by its simplicity in construction and operation and involving no difficult balancing problems and no massive parts to be oscillated along with the gyrating gear. A further object of the invention is a gearing system of this character including a flexible coupling.

For a better understanding of the invention reference may be had to the accompanying drawings forming a part of this application wherein.

Figure 1:
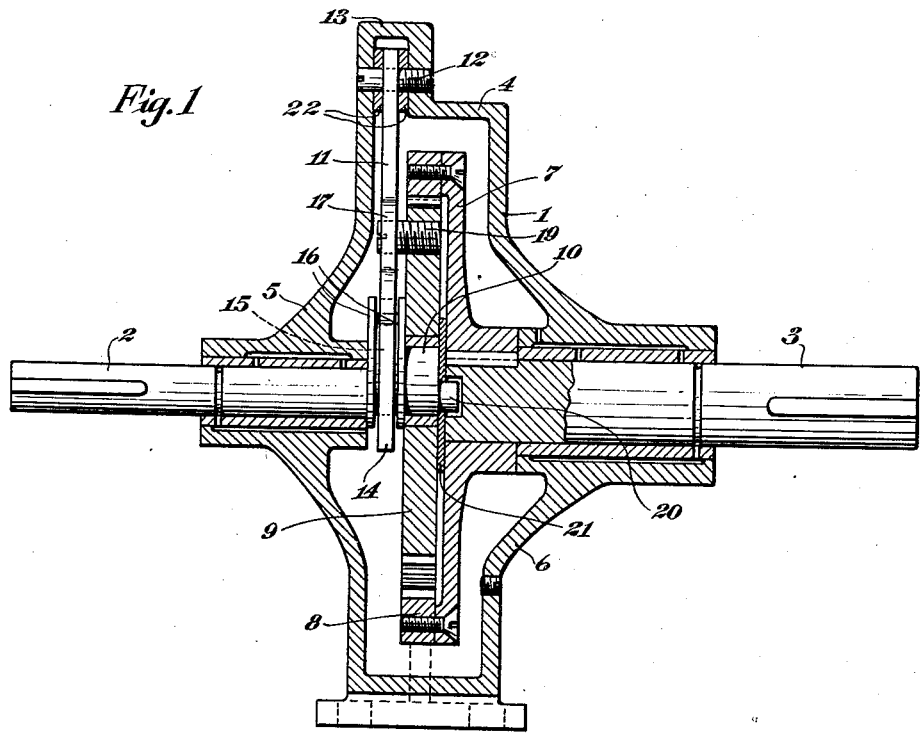
Fig. 1 is a sectional view of a reduction gear system embodying my invention.
Figure 2:
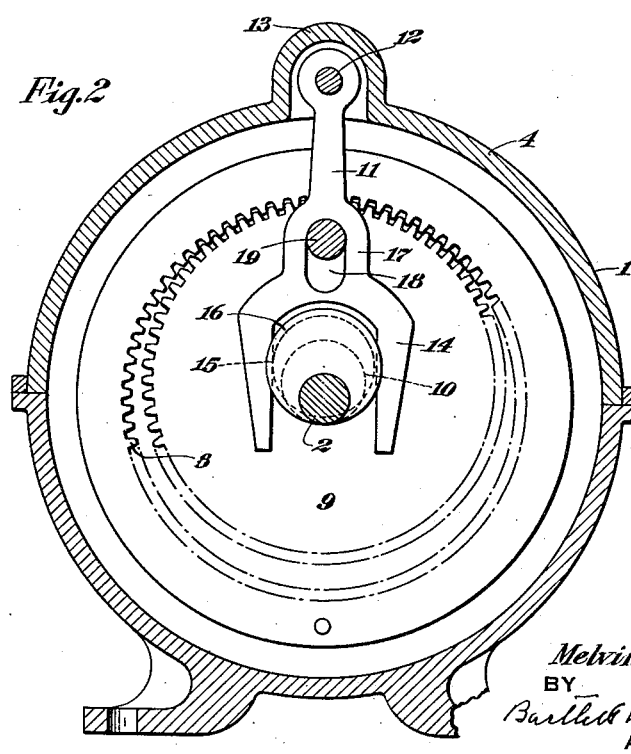
Fig. 2 is a sectional view at right angles to that of Fig 1.

Referring to Figs. 1 and 2 of the drawings I have indicated my speed reducer or power transmission system as including a casing 1, in which are journalled the high and low speed power transmission shafts 2 and 3 respectively. The casing 1 may assume any form desired and in the particular form illustrated comprises a cylindrical part 4, an end disc 5 in which the shaft 2 is journalled and an end disc 6 in which the shaft 3 is journalled. The gear reduction system may include one or more reduction units or stages and in the particular embodiment shown I have indicated a single unit or stage. The shaft 3 is journalled in alignment with shaft 2 and carries adjacent to the latter a gear element 7, the latter being fastened to the shaft 3 in any suitable manner, as for example by bolting or by keying the same thereto. The gear element 7 is formed with an annular internal gear ring 8 which is traversed by a gyrating spur gear 9 and the gear 9 is gyrated and caused to traverse the internal gear 8 by means of an eccentric 10 which is formed as a part of or is fastened or keyed to the shaft 2, the gear 9 being journalled, by means of ball bearings if desired, upon the eccentric 10. The gear 9 is permitted to have rotation relatively to the eccentric 10, but is restrained and prevented from rotating by means of an oscillating lever 11, the latter being pivotally carried at its upper end by the casing element 4, as for example by means of a pin 12 carried by a protuberance 13 formed on the casing. The oscillating lever 11 comprises at its lower end a fork 14 which straddles an eccentric 15 formed as part of or on the shaft with the eccentric 10 and having guide flanges or collars 16 for restraining the fork 14 against axial displacement. The lever 11 is provided with an enlargement 17 intermediate its ends wherein is formed an elongated slot 18 and in this slot is disposed a pin 19 which is carried by the gear element 9.

The shafts 2 and 3 are indicated as in alignment and the shaft 2 has an end 20 projecting into a recess formed in the end of the shaft 3. At 21 I have indicated a bearing washer between the gear elements 9 and the gear 7 and I have shown similar bearing washers 22 on the opposite sides of the pivoted end of the oscillating lever 11.

The operation of the reduction gearing system is as follows:

Power may be transmitted through the power shaft 2 and the reduction system to the shaft 3 and the speed reduction ratio is determined by the relative number of teeth of the spur gear 9 and the internal gear 8. The rotation of the shaft 2 drives the eccentric 10 and causes the gyrating gear 9 to traverse the internal gear 8 and since the gyrating gear is prevented from rotating the gear 8 is driven at a speed depending upon the relative number of teeth of the gear elements. The gyrating gear 9 is caused to traverse the internal gear 8 in a manner to give a substantially uniform pitch line velocity, the rotation restraining lever or yoke 11 causing the gyrating gear to assume and maintain a definite orientation with reference to the internal gear 8. The lever or yoke 11 oscillates to the right and left proportionally to the corresponding movement of the gyrating gear, this being effected by the eccentric 15 which revolves in unison and timed relation with the eccentric 10. The eccentric 15 is larger than the eccentric 10, that is its throw or eccentricity is larger. In the particular embodiment shown the eccentricity or throw of the eccentric 15 is something less than twice that of the eccentric 10, this being necessary because the distance of the slot 18 or the average distance of the pin 19 from the center of the shaft 2 is smaller than the distance to the center of the pivot pin 12, this proportion being necessary to secure uniform angular velocity of the output shaft with respect to the input shaft. If the average distances from the pin 19 to the center of shaft 2 and the center of pivot pin 12 were exactly equal then the eccentricity or throw of the eccentric 15 would need to be twice that of the eccentric 10 in order to obtain the uniform output characteristic of my invention. That is, the eccentricity of the larger eccentric 15 bears the same relation to the eccentricity of the smaller eccentric 10 as the distance from the pivotal connection 12 to the center of the shaft 2 bears to the average distance of the pin 19 to said pivotal connection 12. When the average distances from the pin 19 to the center of the shaft 2 and to the pivotal point 12 of the yoke are varied with respect to each other, then correspondingly the throw or throws of the eccentrics must be varied proportionately. The relative proportions of the eccentrics 10 and 15 and the distances from the slot 18 and pin 19 to the axis of the shaft 2 and to the pivotal point of the yoke, as above described, permit the pin 19 to assume horizontal movements equal to the horizontal traverse of the gyrating gear, the elongated slot 18 permitting the free up and down movement of the gyrating gear. It is obvious that instead of a single stage speed reducer additional stages may be added thereto.

Figure 3:
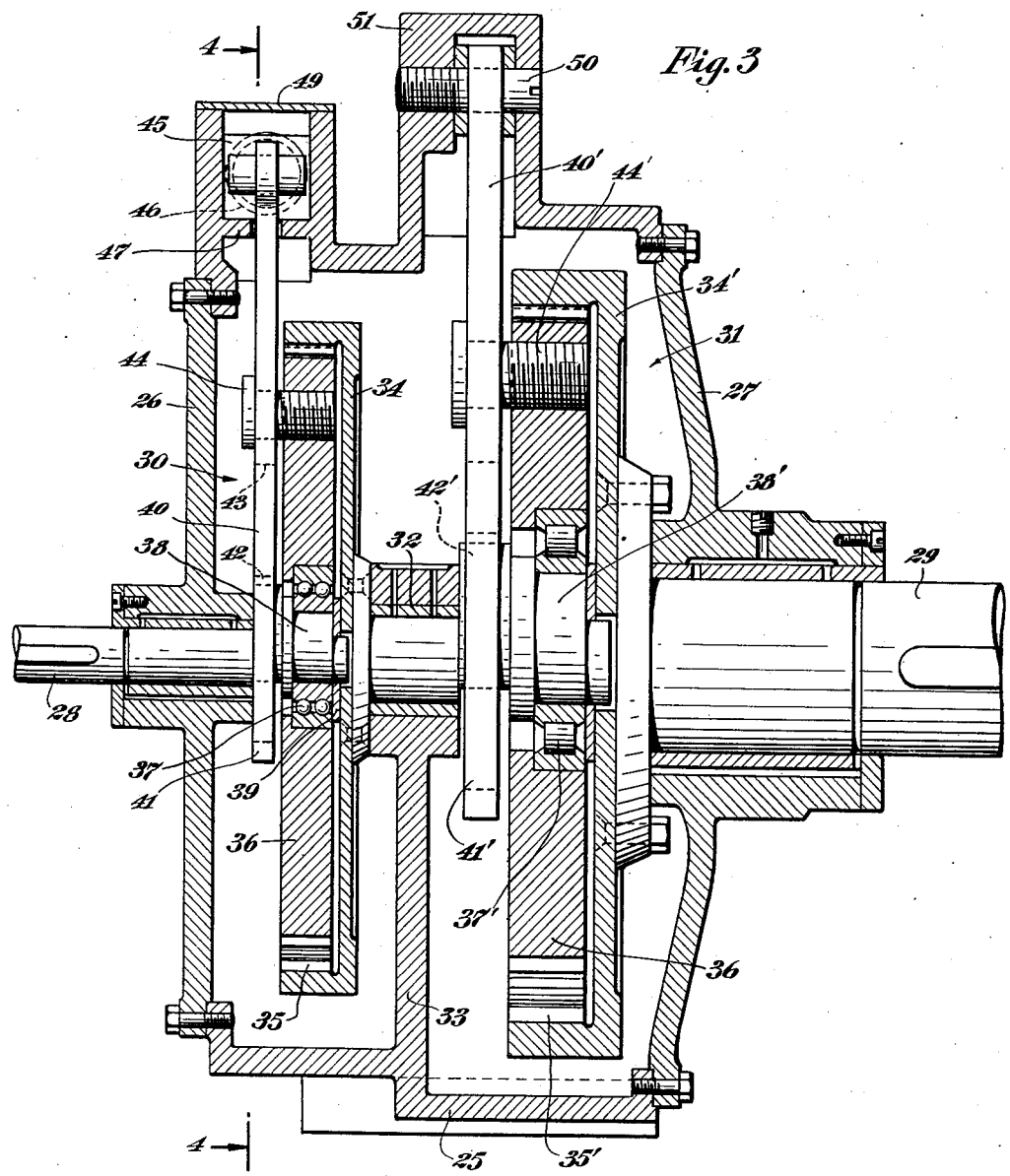
Fig. 3 is a sectional view of a reduction gear system embodying my invention in a modified form.
Figures 4, 5:
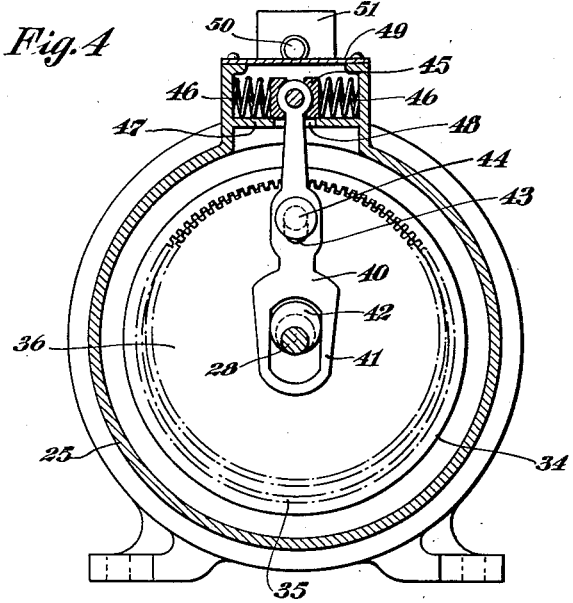
Fig. 4 is a sectional view along the line 4—4 of Fig. 3.

In the modification of Figs. 3 and 4 I have shown a two stage speed reducer with one of the units or stages embodying a flexible coupling. The speed reducer is contained in a casing generally of cylindrical form having end closing discs 26 and 27 with the high and low speed shafts 28 and 29 journalled respectively in these and closing discs 26 and 27. The reduction gear stages are indicated at 30 and 31 and an intermediate stub or drive shaft 32 is journalled in a bulkhead or web 33 formed as a part of the cylindrical casing 25, the shafts 28, 32 and 29 being journalled in alignment. The gear stage 30 includes a gear element 34 bolted or otherwise fastened to the intermediate shaft 32 and having an internal gear ring 35. A gyrating spur gear 36 is adapted to traverse this internal gear ring 35. It is journalled by means of ball bearings 37 upon an eccentric 38 keyed or otherwise fastened to the drive shaft 28 and a bearing washer 39 is disposed between the gyrating gear 36 and the web of the gear element 34. The gyrating gear 36 is prevented from rotation by means of an oscillating lever or yoke 40 which is similar to the lever 11 of Figs. 1 and 2. Its forked end 41 straddles an eccentric 42 which forms a part of the eccentric 38 or is formed independently thereof but carried by the shaft 28 in timed relation therewith. As above described with respect to Figs. 1 and 2, where the average distances from the pin 44 to the center of the shaft 28 and to the pivotal point of the yoke are equal, the eccentricity or throw of the eccentric 42 must be twice that of the eccentric 38 and this is the preferred arrangement; although the eccentricity of the eccentric 42 may be decreased proportionately where the average distance to the center of the shaft 28 is less than the distance to the pivotal point of the yoke and may be increased proportionately where the distance to the center of the shaft 28 is greater than the distance to the pivotal point of the outer end of the restraining arm, but the eccentricity of the restraining arm eccentric must always be substantially larger than that of the gyrating gear eccentric. Intermediate its ends the lever or yoke is provided with an elongated slot 43 which accommodates and is traversed by a pin 44 fixed to the gyrating gear 36. The lever or yoke 40 instead of being fixedly pivoted to the frame of the unit is pivoted to a yieldingly mounted bearing unit 45, the latter being retained between a pair of compression springs 46 and reciprocable against the tension of these springs along the bearing shelf 47, the latter having a slot 48 for permitting the oscillating movements of the lever 40. A cover plate 49 is indicated for gaining access to the bearing block 45 and the springs 46. The drawings are purposely made diagrammatic but it is understood that the yielding means 45, 46 effects a yielding coupling between the gyrating gear 36 and the internal gear 35 thereby providing a flexible and yielding drive. The operation is otherwise the same as that described with reference to Figs. 1 and 2, the power being applied to shaft 28 being transmitted through the reduction gear unit 30 to the drive shaft 32. The second stage 31 is similar to the first stage 30 except that the flexible coupling and drive in this stage is omitted. I have indicated the corresponding elements in stage 31 with the corresponding numerals of stage 30 with primes added. Here for example the internal gear 35' is driven by the gyrating gear 36', the latter being journalled by ball bearings 37' upon an eccentric 38' which is keyed to the shaft 32. While the lever or yoke 40' is provided with a forked end 41' straddling an eccentric 42' carried by the shaft 32 in timed relation with the eccentric 38'. A pin 44' traverses a slot 43' formed in the lever or yoke 40' and the lever or yoke is pivoted on a pin 50 which is suitably carried by a protuberance 51 in the casing. The power from the shaft 32 is transmitted to the shaft 29 at a speed ratio depending upon the relative number of teeth of the gyrating and internal gear rings. The combined speed reduction of the two stages is, of course, the speed ratios of the two stages multiplied together. I have thus devised a gyral gear reduction unit of simple construction which may be readily designed for practical operation at any speed or power without the vibration in operation or pulsations in transmission characteristic of prior gyral gear transmissions. Uniform pitch line velocity or torque is obtained by the simple construction and mechanism set fort and unlike prior proposed reciprocating restraining yoke and double eccentric arrangements and other prior attempts to approximate uniformity in drive my unit is free from inertia and vibration effects of heavy reciprocating restraining yokes and heavy oscillating restraining weights operated by the gyrating gears or eccentrics. Moreover, in the particular and preferred embodiment shown the restraining arm is pivotally mounted pendulum-like from the casing and has the pin slot restraining connection intermediate its ends and no part of the weight thereof is carried by the gyrating means. The balancing of the gyral gears, eccentrics and whole mechanism is thereby facilitated for high speed operation.

I claim:

1. In a power transmission and speed reduction system, a frame, a driven internal gear element, a drive shaft and eccentric carried by said shaft, a gyrating gear carried by and journalled upon said eccentric and adapted to traverse said driven gear, a rotation restraining means for the gyrating gear including a member pivotally fastened at one end to the framework and operatively engaged with the drive shaft at its other end to oscillate proportionally to but through greater amplitudes than the gyrating gear, and rotation restraining means between the gyrating gear and the restraining member intermediate its ends locking the gear against rotation in either direction.

2. In a power transmission system of the character set forth in claim 1 wherein the means for restraining the rotation of the gear element includes a spring mechanism for effecting a flexible drive.

3. In a system of the character set forth in claim 1 wherein one end of the restraining member is in the form of a fork which straddles a second eccentric on the shaft which is a greater eccentricity than that of the ecentric upon which the gyrating gear is journalled.

4. In a system of the character set forth in claim 1 wherein the rotation restraining means between the gyrating gear and the member comprises a pin traversing a slot formed in the restraining member.

5. In a power transmission system of the character set forth in claim 1 wherein the rotation restraining means comprises a spring mechanism whereby varying forces upon the drive react yieldingly back through the rotation restraining means.

6. A speed reduction unit comprising a casing, a drive shaft journaled in said casing, a driven shaft journaled in said casing, an internal gear element driving said driven shaft, an eccentric keyed to the drive shaft, an intermediate gear journaled upon said eccentric and caused to traverse the internal gear element when the eccentric is rotated, a second eccentric on the drive shaft of greater eccentricity than that of the first eccentric, a substantially vertically disposed arm pivotally connected to the casing at one end and engaging said second eccentric at its other end for oscillation back and forth proportionately to and in timed relation with the first eccentric but through greater amplitude than those of the gyrating gear and a rotation restraining connection between the arm and the gear intermediate the pivotal point and the second eccentric preventing rotation of the gear in either direction upon the first eccentric but permitting relative movement thereof with respect to the arm in one direction.

7. In a power transmission system of the character set forth in claim 6 wherein the rotation restraining means includes a spring mechanism for effecting a flexible drive.

8. In a speed reduction unit of the character set forth in claim 6 wherein the retarding arm is pivotally connected to the casing at its upper end and is suspended pendulum-like therefrom.

9. In a reduction gear drive, a frame, a drive shaft, a driven shaft, an internal gear element driving the driven gear, a gyrating gear element disposed within the internal gear element, an eccentric driven by the drive shaft for gyrating said gear, a second eccentric driven by the drive shaft in timed relation and in unison with the first eccentric and having an eccentricity greater than that of the first eccentric, a member restraining the rotation of the gyrating gear, said restraining member having a connection with a relatively fixed part of the framework permitting angular movements with respect thereto and having operative connections with said second eccentric for causing said angular movements and a pin slot connection intermediate the second eccentric and the connection with the frame disposed at a point to cause said pin slot connection to follow in direction and quantity the lateral movements of the gyrating gear during each revolution.

10. In a gyral gear drive, a frame, an eccentric for gyrating one of the gear elements, a member for restraining the rotation of said gear, said member having a connection with the frame permitting angular movements thereof, a second eccentric of greater eccentricity than the first eccentric which is also driven by the drive shaft and in timed relation and in unison with said first eccentric, said member being operatively engaged by said second eccentric to cause angular oscillatory movements of the same and a pin slot connection between said member and the gyrated gear for preventing rotation of the gear in either direction, the distance of said pin slot connection from the connection with the frame and from the eccentric and the eccentricities of the eccentrics being relatively proportioned to cause the pin slot connection to follow in direction and quantity the lateral movements of the gyrating gear.

11. A gyral gear speed reduction drive comprising a frame, a gyrating gear, an eccentric for gyrating the gear, a second eccentric of greater eccentricity than that of the first and a rotation restraining member, said member having a pin slot connection directly with the gyrating gear for locking the gear against rotation in either direction, a connection with the frame permitting oscillations of the member thereabout, and an operative connection with the second eccentric, the eccentrics and the relative distances of the connections being relatively proportioned to cause the restraining connection with the gyrating gear to follow the lateral movements thereof in direction and quantity.

12. A gyral gear drive of the character set forth in claim 11 wherein the rotation restraining member is an elongated vertically disposed member and the connection with the frame is a pivotal weight carrying connection with the weight of the restraining member removed from the eccentric.

13. A gyral gear drive unit comprising a casing, a gyrating gear, a shaft with an eccentric for gyrating the gear, a second eccentric driven by said shaft of greater eccentricity than that of the first and a rotation restraining member, said member having intermediate its ends a rotation restraining connection directly with the gyrating gear, a connection with the casing permitting oscillations of the member thereabout as a center, one of said connections permitting relative radial movements, and an operative connection with the second eccentric for oscillating the member in timed relation with the gyrations of the gear, the eccentricity of the second eccentric bearing the same relation to that of the first as the distance from the connection with the casing to the center of the drive shaft bears to the distance from this connection to the restraining connection.

14. A speed reduction unit of the character set forth in claim 13 wherein pivotal connection of the arm with the framework comprises spring cushioning mechanisms disposed on opposite sides of the arm.

15. A speed reduction unit of the character set forth in claim 13 wherein the retarding arm is pivotally connected to a bearing block and compression springs are provided on the opposite sides of the block.

16. A speed reduction unit of the character set forth in claim 13 wherein the second eccentric has substantially twice the throw of the first eccentric and the rotation restraining connection is disposed substantially midway between the drive shaft and the pivotal connection.

17. A speed reduction drive unit comprising a frame, a driven internal gear element, a driving gyrating gear element of a lesser number of teeth than the internal gear, a shaft with an eccentric for gyrating the driving gear and causing it to traverse the internal gear element, a rotation restraining member having intermediate its ends a rotation restraining connection with the gyrating gear locking the same against rotation in either direction and having a connection with the frame permitting inclinations of the member in planes at right angles to the axis of gyration of the gyrating gear, a second eccentric on said shaft of a greater eccentricity than that of the eccentric gyrating the gear, said rotation restraining member having one end in operative engagement with said second eccentric to cause the same to oscillate laterally, the eccentricity of the second eccentric bearing the same relation to that of the first as the distance from the connection with the frame to the center of the drive shaft bears to the distance from this connection to the restraining connection.

18. In a gyral gear drive, a casing, a driven internal gear element, a driven gear element within said internal gear element, a shaft with an eccentric thereon for gyrating said last named gear and causing it to traverse the periphery of the internal gear element, means for normally preventing the rotation of said gyrating gear and orienting the same, notwithstanding the gyrations thereof, comprising an oscillating arm having a connection with the casing permitting inclinations thereof in planes transverse to the axis of gyration and a rotation restraining connection with the gyrating gear for preventing rotation in either direction, one of said connections permitting relative radial movements, a second eccentric on the drive shaft of a different eccentricity from that of the first eccentricity, said arm engaging the second eccentric at its inner end and operated thereby to cause lateral oscillations of the same, the eccentricity of the second eccentric bearing the same relation to that of the first as the distance from the connection with the casing to the center of the drive shaft bears to the distance from this connection to the restraining connection.

19. A speed reduction drive comprising a frame, a driven internal gear element, a driven gyrating gear element of a lesser number of teeth than the internal gear with means for gyrating the same and causing it to traverse the internal gear element, a biasing and cushioning mechanism and retaining means therefor carried by the frame, and a rotation restraining member having a rotation restraining connection with said gyrating gear and having a connection with the biasing mechanism permitting inclinations of the member in planes at right angles to the axis of gyration of the gyrating gear, the rotation restraining member having a pin slot connection with the gyrating gear, permitting relative radial movements between the member and the arm, and means being provided for actuating the member in planes at right angles to the axis of gyration to impart lateral movements to the pin slot connection in direction and quantity equal to that of the gyrating gear.

MELVIN B. BENSON.